US011080905B1

(12) United States Patent
McCarty et al.

(10) Patent No.: US 11,080,905 B1
(45) Date of Patent: Aug. 3, 2021

(54) SYSTEM AND METHOD OF IMAGE ANALYSIS OF USER-ILLUSTRATED PROCESS FLOW TO AUTOMATE GENERATION OF EXECUTABLE CODE INSTRUCTIONS

(71) Applicant: Dell Products, LP, Round Rock, TX (US)

(72) Inventors: Dennis Matthew McCarty, Pennsauken, NJ (US); Tiffany T. Powley, Plymouth Meeting, PA (US); Thang Ngoc Mai, Downington, PA (US); Christopher R. Taylor, Marysville, OH (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/854,715

(22) Filed: Apr. 21, 2020

(51) Int. Cl.
*G06T 11/20* (2006.01)
*G06T 7/543* (2017.01)
*G06T 11/60* (2006.01)

(52) U.S. Cl.
CPC ........... *G06T 11/206* (2013.01); *G06T 7/543* (2017.01); *G06T 11/60* (2013.01)

(58) Field of Classification Search
CPC ....... G06T 11/206; G06T 7/543; G06T 11/60; G06T 11/40; G06T 11/203; G06T 17/00; G06T 11/001; G06T 11/00; G06F 3/0481; G06F 17/246; H04L 12/2458; G06Q 10/10
See application file for complete search history.

*Primary Examiner* — Todd Buttram
(74) *Attorney, Agent, or Firm* — Prol Intellectual Property Law, PLLC; H. Kenneth Prol

(57) ABSTRACT

An information handling system operating an image analysis integration flow creation system may comprise a network interface device receiving a captured image of an illustrated integration process flow chart connecting process step illustrations in a user-specified pattern, and a processor determining a process flow plot connecting visual element placeholders corresponding to the process step illustrations according to the user-specified pattern. The processor may identify an image shape within each process step illustration and image shape-identifying parameters for that image shape, apply a neural network to determine a type of integration process visual element represented by each process step illustration, based on the image shape-identifying parameters, and generate an integration process flow model displayed in a GUI by inserting the type of integration process visual element represented by each process step illustration into the visual element placeholder corresponding to that process step illustration.

20 Claims, 10 Drawing Sheets

SYSTEM AND METHOD OF IMAGE ANALYSIS OF USER-ILLUSTRATED PROCESS FLOW TO AUTOMATE GENERATION OF EXECUTABLE CODE INSTRUCTIONS

FIELD OF THE DISCLOSURE

The present disclosure relates generally to a system and method for deploying and executing customized data integration processes. More specifically, the present disclosure relates to modeling an integration process flow comprising several visual elements representing steps of the process, based on a captured image of a user-illustrated flow.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
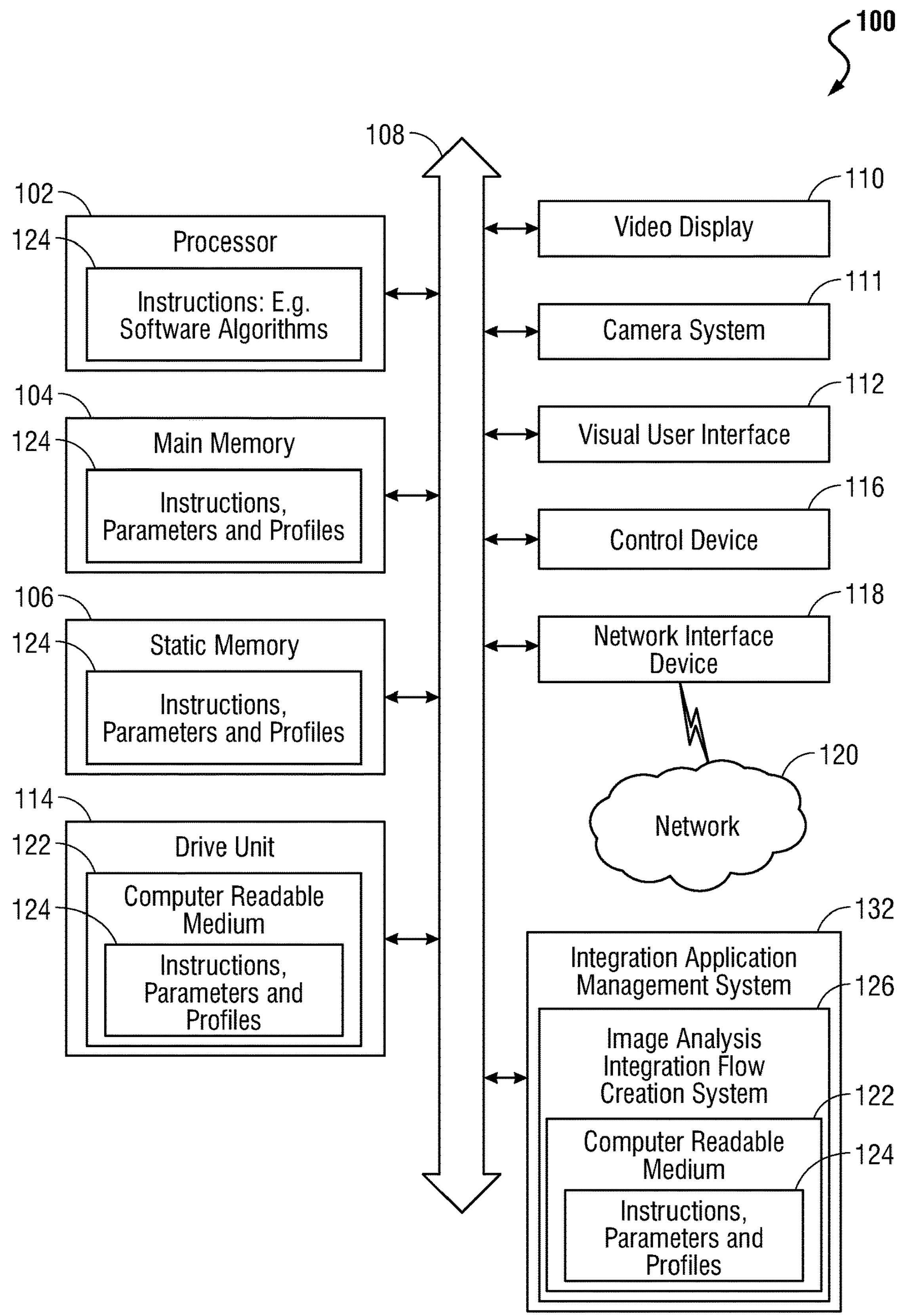
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, or distribution via download of the application from the worldwide web to an end user. Upon receipt of the downloaded application, the end user executes installation files to install the executable software application on the user's personal computer (PC), or other information handling system. When the software is initially executed, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. In many instances, these disparate computing networks, enterprises, or systems are located in a variety of different countries around the world. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system, and a seller's invoicing system. Some of these different software applications/systems may be cloud-based, with physical servers located in several different countries, cities, or other geographical locations around the world. As data is integrated between and among these cloud-based platforms, datasets may be stored (e.g., temporarily or indefinitely) in some form at physical servers in these various geographical locations.

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are available in the market today. These applications are typically purchased from software vendors and installed on a computerized system owned and maintained by the business, in this example, the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc., physically located outside of an enterprises' physical boundaries). After the generic application is installed, it is then configured and customized for a specific trading partner after which it is ready for execution to exchange data between the specific trading partner and the enterprise. For example, Walmart® may provide on its website specifications of how electronic data such as Purchase Orders and Invoices must be formatted for electronic data communication with Walmart, and how that data should be communicated with Walmart®. A supplier/enterprise is then responsible for finding a generic, commercially available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured graphical user interface to visually model a business integration process via a flowcharting process, using only a web browser interface. During such a modeling process, the user would select from a predetermined set of process-representing visual elements that are stored on a remote server, such as the web server. By way of an example, the integration process could enable a bi-directional exchange of data between internal applications of an enterprise, between internal enterprise applications and external trading partners, or between internal enterprise applications and applications running external to the enterprise.

A customized data integration software application creation system in an embodiment may allow a user to create a customized data integration software application by modeling a data integration process flow using a visual user interface. A modeled data integration process flow in embodiments of the present disclosure may model actions taken on data elements pursuant to executable code instructions without displaying the code instructions themselves. In such a way, the visual user interface may allow a user to understand the high-level summary of what executable code instructions achieve, without having to read or understand the code instructions themselves. Similarly, by allowing a user to insert visual elements representing portions of an integration process into the modeled data integration process flow displayed on the visual user interface, embodiments of the present disclosure allow a user to identify what she wants executable code instructions to achieve without having to write such executable code instructions.

Integration processes in the current era of teleconferencing and videoconferencing may result from collaboration between multiple entities or individuals that may be located in the same place or geographically distant from one another.

Often, the processes discussed or resulting from such collaboration begin as hand drawn illustrations (e.g., on a dry erase board, smart board, paper, or even cocktail napkin), or computer assisted sketches (e.g., created with a stylus and computer sketching application). References to hand-drawn or manually-formed illustrations made herein are contemplated to include each of these types of illustrations, as well as any other illustration created without the use of the graphical visual user interface described herein with respect to FIG. 3. In order to create a process flow that can be used to customize code instructions for an integration process, current systems require a user to model the process flow using the graphical visual user interface, while referencing the hand-written illustrations. In other words, in current systems, a user must select each visual element illustrated, and connect these visual elements in the same way they are connected within the hand-drawn or manually-formed illustration. A solution is needed that may automate this process, thus no longer requiring the user to duplicate the modeled process using the graphical visual user interface.

Embodiments of the present disclosure address this issue by automatically generating the integration process flow model based on a captured image of the hand-drawn or manually-formed illustration. In embodiments described herein, a shape recognition method may identify a plurality of shapes within the captured image of the illustration, as well as several descriptive aspects of each shape, such as, for example, area, perimeter, circular diameter, bounding rectangle dimensions and orientation. Each shape identified in embodiments may correspond to a visual element in the modeled process flow, or a connection between two visual elements (e.g., an arrow). The position and orientation of each identified visual element (e.g., identified shape) with respect to one another, as well as identification of connections between shapes may be used to determine a plot showing placement of each visual element within a process flow. In other words, the position of each identified shape from left to right, or the orientation of such shapes with respect to one another (e.g., placed horizontally with respect to one another or vertically with respect to one another) may be used to determine the direction in which the process flows, as well as which visual elements are connected to one another and how.

In embodiments described herein, the placement of each shape within the determined plot, and the descriptive aspects of each identified shape resulting from application of the shape recognition method to the captured image, may be input into a neural network, machine learning classifier, or other artificial intelligence system in order to determine the type of each visual element represented by each identified shape. A visual model of the process flow may then be generated by automatically connecting each identified type of visual element according to the determined plot position for its associated shape. Such a visual model in embodiments may be displayed via the graphical visual user interface. In such a way, embodiments of the present disclosure may automate generation of an integration process flow model, viewable via the graphical visual user interface, based on a captured image of a hand-drawn or manually-formed illustration of the intended process flow.

Once the process flow indicating what a user wishes to achieve has been automatically modeled based on the captured image of an illustration in embodiments herein, the code instructions capable of achieving such a task may be generated. Code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high level knowledge of computer science. Such open-standard, human-readable, data structure formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the code instructions of the business integration process in some embodiments herein may be written in accordance with the same open-standard formats or other known, or later-developed standard formats.

In addition to the advent of open-standard, human-readable, machine-executable code instructions, the advent of application programming interfaces (APIs) designed using such open-standard code instructions have also streamlined the methods of communication between various software components. An API may operate to communicate with a backend application to identify an action to be taken on a dataset (e.g., a data field name and data field value, or name/value pair) that the backend application manages, or which is being transmitted for management to the backend application. The code instructions generated at a service provider, pursuant to the integration process flow modeled by the user via the visual elements in embodiments described herein may constitute an API in some instances. In embodiments described herein, a runtime engine may be created for execution of each of these code instructions written based on the user-modeled business integration process. The runtime engine, and all associated code instructions or code sets may be packaged together and audited for code errors, then transmitted to an end user for execution at the user's computing device, or enterprise system, and potentially, behind the user's firewall.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the image analysis integration flow creation system 126, or the integration application management system 132 that may operate on servers or systems, remote data centers, or on-box in individual client information handling systems such as a local display device, or a remote display device, according to various embodiments herein. In some embodiments, it is understood any or all portions of code 124 for the image analysis integration flow creation system 126 or the integration application management system 132 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the image analysis integration flow creation system 126, or the integration application management system 132 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the image analysis integration flow creation system 126, or the integration application management system 132. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. The information handling system 100 may also include an image acquisition device 111, such as a camera system, infrared imaging system, or other imaging system. For example, a camera system 111 may include a charge coupled device (CCD) digital camera imaging system in some embodiments. Additionally, the information handling system 100 may include a control device 116, such as an alpha numeric control device, a keyboard, a mouse, touchpad, fingerprint scanner, retinal scanner, face recognition device, voice recognition device, or gesture or touch screen input.

The information handling system 100 may further include a visual user interface 112. The visual user interface 112 in an embodiment may provide a visual designer environment permitting a user to define process flows between applications/systems, such as between trading partner and enterprise systems, and to model a customized business integration process. The visual user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order. The providing of this input by the user results in the system's receipt of such user-provided information as an integration process data profile code set.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), or an API adhering to a known open source specification may enable application programs 124 to interact or integrate operations with one another.

In an example of the present disclosure, instructions 124 may execute software for automatically generating an integration process flow model, viewable via the visual user interface 112, based on a received image of a user-illustration. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, the integration application management system 132, and the image analysis integration flow creation system 126 may include a computer-readable medium 122 such as a magnetic disk, or a solid-state disk in an example embodiment. The computer-readable medium of the memory 104, storage devices 106, 114, and the image analysis integration flow creation system, 132 and 126 may store one or more sets of instructions 124, such as software code corresponding to the present disclosure.

The disk drive unit 114, static memory 106, and computer readable medium 122 of the image analysis integration flow creation system 126, or the integration application management system 132 also contain space for data storage such as an information handling system for managing locations of executions of customized integration processes in endpoint storage locations. Connector code sets, and trading partner code sets may also be stored in part in the disk drive unit 114, static memory 106, or computer readable medium 122 of the image analysis integration flow creation system 126, or the integration application management system 132 in an embodiment. In other embodiments, data profile code sets, and run-time engines may also be stored in part or in full in the disk drive unit 114, static memory 106, or computer readable medium 122 of the image analysis integration flow creation system 126, or the integration application management system 132. Further, the instructions 124 of the image analysis integration flow creation system 126, or the integration application management system 132 may embody one or more of the methods or logic as described herein.

In a particular embodiment, the instructions, parameters, and profiles 124, and the image analysis integration flow creation system 126, or the integration application management system 132 may reside completely, or at least partially, within the main memory 104, the static memory 106, disk drive 114, and/or within the processor 102 during execution by the information handling system 100. Software applications may be stored in static memory 106, disk drive 114, and the image analysis integration flow creation system 126, or the integration application management system 132.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof.

The image analysis integration flow creation system 126 and the integration application management system 132 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the image analysis integration flow creation system 126, and the integration application management system 132. The image analysis integration flow creation system 126, and the integration application management system 132 may be operably connected to the bus 108. The image analysis integration flow creation system 126 and the integration application management system 132 are discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the image analysis integration flow creation system 126, and the integration application management system 132 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
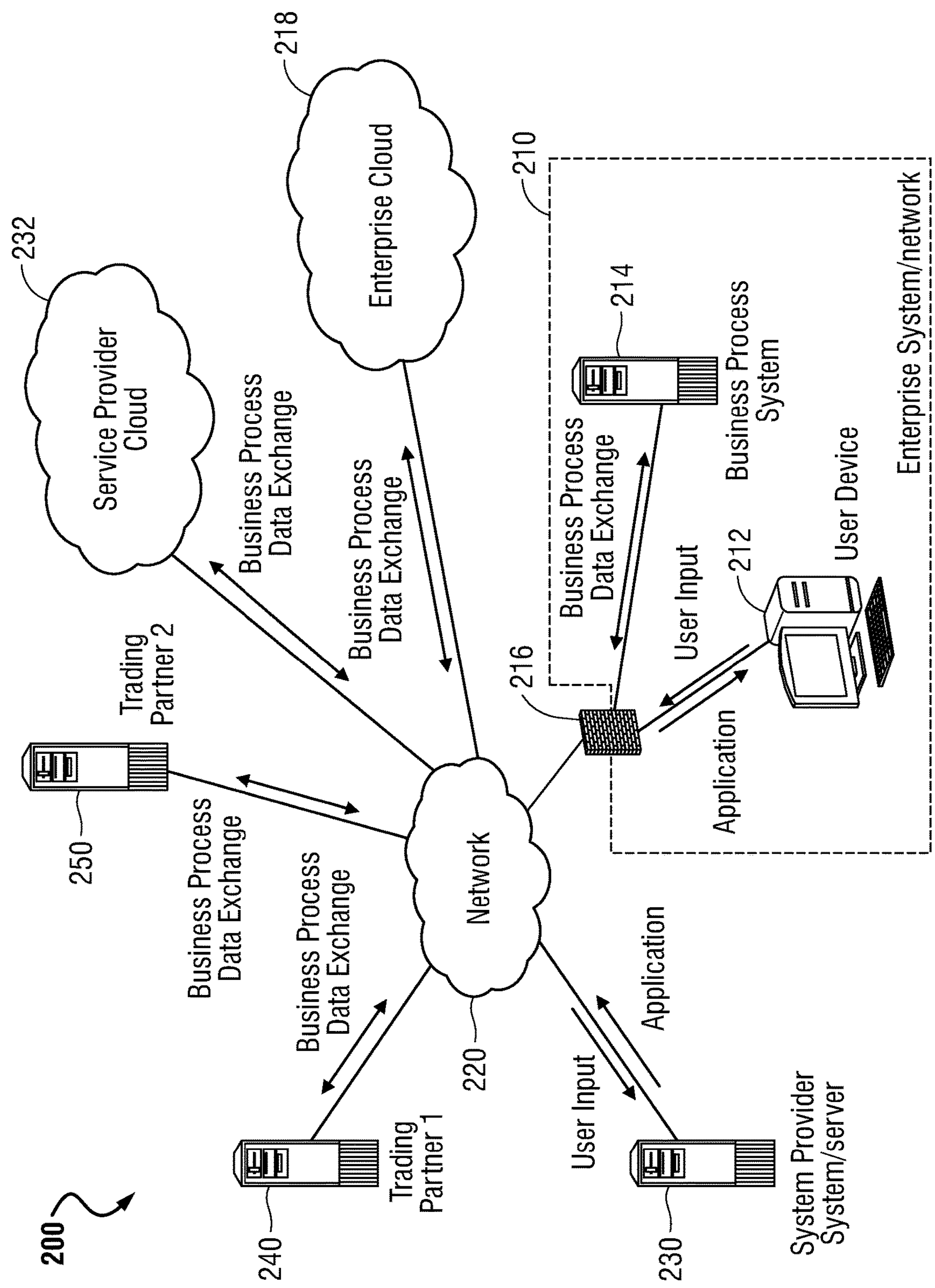
FIG. 2 is a block diagram illustrating a simplified integration network according to an embodiment of the present disclosure.

FIG. 2 is a graphical diagram illustrating a simplified integration network 200 including a service provider system/server 230 and an enterprise system/network 214 in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 212, such as a conventional desktop or laptop PC, enabling a user to communicate via the network 220, such as the Internet. In another aspect of an embodiment, the user device 212 may include a portable computing device, such as a computing tablet, or a smart phone. The user device 212 in an embodiment may be configured with conventional web browser software, such as Google Chrome®, Firefox®, or Microsoft Corporation's Internet Explorer® for interacting with websites via the network 220. In an embodiment, the user device 212 may be positioned within an enterprise network 210 behind the enterprise network's firewall 216, which may be of a conventional type. As a further aspect of an embodiment, the enterprise network 210 may include a business process system 214, which may include conventional computer hardware and commercially available business process software such as QuickBooks, SalesForce's™ Customer Relationship Management (CRM) Platform, Oracle's™ Netsuite Enterprise Resource Planning (ERP) Platform, Infor's™ Warehouse Management Software (WMS) Application, or many other types of databases or applications managing datasets and accessible via APIs.

In an embodiment, the integration network 200 may further include trading partners 240 and 250 operating conventional hardware and software for receiving and/or transmitting data relating to business-to-business transactions. For example, Walmart® may operate trading partner system 240 to allow for issuance of purchase orders to suppliers, such as the enterprise 210, and to receive invoices from suppliers, such as the enterprise 210, in electronic data form as part of electronic data exchange processes. Electronic data exchange process in an embodiment may include data exchange via the world wide web. In other embodiments, electronic data exchange processes may include data exchange via File Transfer Protocol (FTP) or Secure File Transfer Protocol (SFTP).

In an embodiment, a provider of a service ("service provider") for creating on-demand, real-time creation of customized data integration software applications may operate a service provider server/system 230 within the integration network 200. The service provider system/server 230 may be specially configured in an embodiment, and may be capable of communicating with devices in the enterprise network 210. The service provider system/server 230 in an embodiment may host an integration process-modeling user interface in an embodiment. Such an integration process-modeling user interface may allow a user to model an integration process including one or more sub-processes for data integration through a business process data exchange between an enterprise system/network 210 and outside entities or between multiple applications operating at the business process system 214. The integration process modeled in the integration process-modeling user interface in an embodiment may be a single business process data exchange shown in FIG. 2, or may include several business process data exchanges shown in FIG. 2. In some embodiments, the integration process modeled in the integration process-modeling user interface may comprise its own API. For example, the enterprise system/network 210 may be involved in a business process data exchange via network 220 with a trading partner 1, and/or a trading partner 2. In other example embodiments, the enterprise system/network 210 may be involved in a business process data exchange via network 220 with a service provider located in the cloud 232, and/or an enterprise cloud location 218. For example, one or more applications between which a dataset field value may be transferred, according to embodiments described herein, may be located remotely from the enterprise system 210, at a service provider cloud location 232, or an enterprise cloud location 218.

The user of an integration process-modeling user interface in an embodiment may model one or more business process data exchanges via network 220 within an integration process by adding one or more connector integration visual elements in a graphical visual user interface, as described with reference to FIG. 3 below, or adding code sets to an integration process flow. In embodiments described herein, the image analysis integration flow creation system may also model one or more such business process data exchanges within an integration process in the graphical visual user interface, based on analysis of a user-created illustration of such a process. These connector integration elements in an embodiment may model the ways in which a user wishes data to be accessed, moved, and/or manipulated during the one or more business process data exchanges, or executions of the API. Each connector element the image analysis integration flow creation system or the user adds to the integration process flow diagram in an embodiment may be associated with a pre-defined subset of code instructions stored at the service provider systems/server 230 in an embodiment.

The service provider system/server 230 may generate a run-time engine capable of executing the pre-defined subsets of code instructions represented by the connector integration elements chosen by the user or indicated by the image analysis integration flow creation system. The runtime engine may then execute the subsets of code instructions in the order defined by the modeled flow of the connector integration elements given in the integration process flow diagram. In such a way, an integration process may be executed without the user having to access, read, or write the code instructions of such an integration process.

In other aspects of an embodiment, a user may initiate a business process data exchange between one cloud service provider 232 and one cloud enterprise 218, between multiple cloud service providers 232 with which the enterprise system 210 has an account, or between multiple cloud enterprise accounts 218. For example, enterprise system 210 may have an account with multiple cloud-based service providers 232, including a cloud-based SalesForce™ CRM account and a cloud-based Oracle™ Netsuite account. In such an embodiment, the enterprise system 210 may initiate business process data exchanges between itself, the SalesForce™ CRM service provider and the Oracle™ Netsuite service provider.

Figure 3:
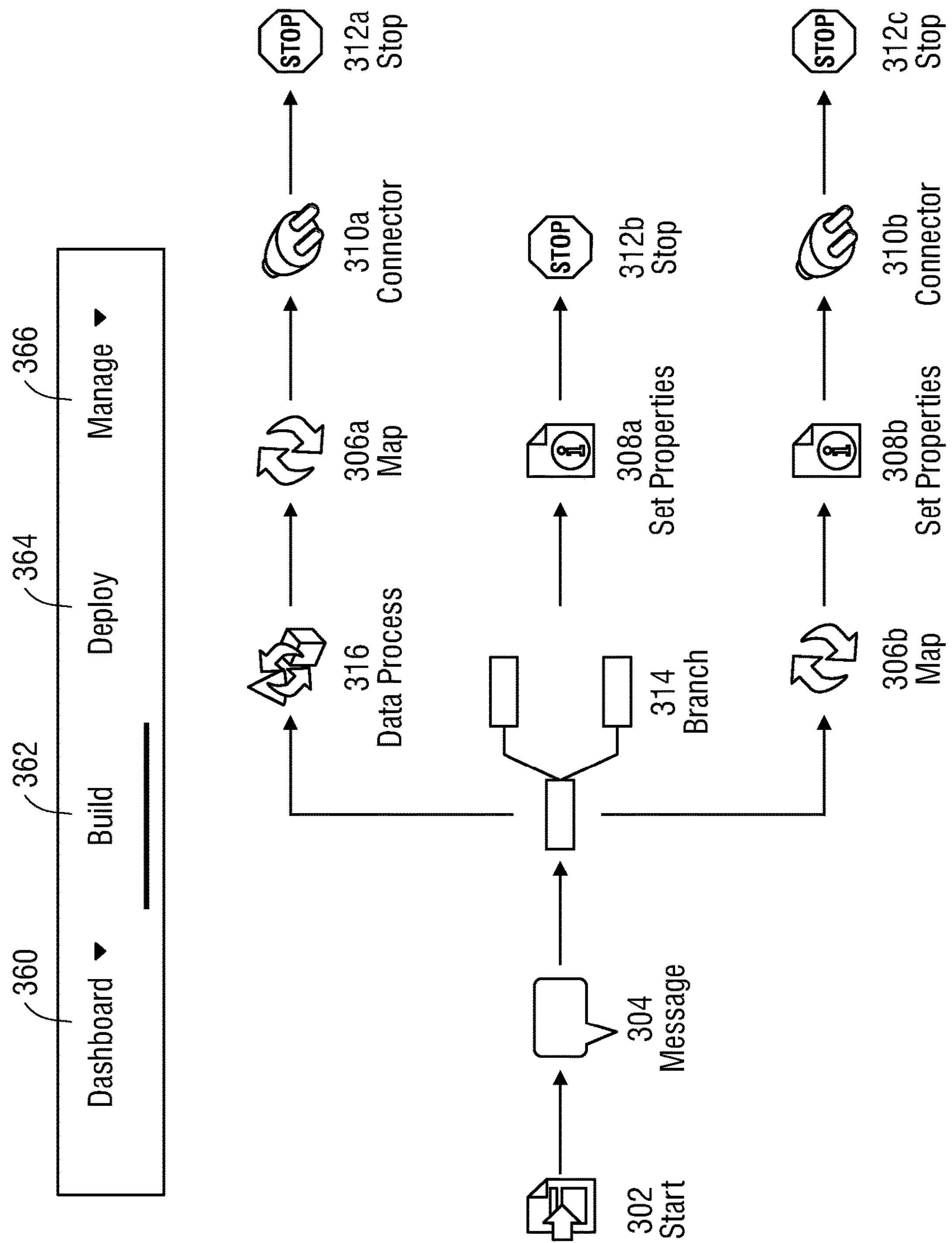
FIG. 3 is a graphical diagram illustrating a user-generated flow diagram of an integration process according to an embodiment of the present disclosure.

FIG. 3 is a graphical diagram illustrating a user-generated flow diagram of an integration process for exchange of electronic data records according to an embodiment of the present disclosure. The flow diagram in an embodiment may be displayed within a portion of a graphical user interface 300 that allows the user to build the process flow, deploy the integration process modeled thereby (e.g., by selecting the deploy tab 364), manage dataset field values manipulated by such an integration process (e.g., by selecting the manage tab 366), and to view high-level metrics associated with execution of such an integration process (e.g., by selecting the dashboard tab 360). The user may build the process flow and view previously built process flow diagrams by selecting the "Build" tab 362 in an embodiment. A user may generate a flow diagram in an embodiment by providing a chronology of process-representing integration elements via the use of an integration process-modeling user interface. In some embodiments, the integration process-modeling user interface may take the form of a visual user interface. In such embodiments, the user-selectable elements representing integration sub-processes (e.g. connector integration elements) may be visual icons.

An integration process-modeling user interface in an embodiment may provide a design environment permitting a user to define process flows between applications/systems, such as between trading partner and enterprise systems, between on-site data centers and cloud-based storage modules, or between multiple applications, and to model a customized business integration process. Such an integration process-modeling user interface in an embodiment may provide a menu of pre-defined user-selectable elements representing integration sub-processes and permit the user or the data integration protection assistance system to arrange them as appropriate to model a full integration process. For example, in an embodiment in which the integration process-modeling user interface is a visual user interface, the elements may include visual, drag-and-drop icons representing specific units of work (known as process components) required as part of the integration process. Such process components in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, etc.

Each process component as represented by integration sub-process icons or elements may be identifiable by a process component type, and may further include an action to be taken. For example, a process component may be identified as a "connector" component. Each "connector" component, when chosen and added to the process flow in the integration process-modeling user interface, may allow the data integration protection assistance system or a user to choose from different actions the "connector" component may be capable of taking on the data as it enters that process step. Further the integration-process modeling user interface in an embodiment may allow the user to choose the dataset upon which the action will be taken. The action and dataset the user chooses may be associated with a connector code set, via the integration application management system, which may be pre-defined and stored at a system provider's memory in an embodiment. The integration application management system operating at least partially at a system provider server/system in an embodiment may generate a dynamic runtime engine for executing these pre-defined subsets of code instructions correlated to each individual process-representing visual element (process component) in a given flow diagram in the order in which they are modeled in the given flow diagram, or by the data integration protection assistance system in a non-visual format.

In an embodiment, a user may choose a process component it uses often when interfacing with a specific trade partner or application, and define the parameters of that process component by providing parameter values specific to that trading partner or application. If the user wishes to use this process component, tailored for use with that specific trading partner or application repeatedly, the user may save that tailored process component as a trading partner or component named specifically for that application. For example, if the user often accesses NetSuite™ or SalesForce™, the user may create a database connector process component, associated with a pre-built connector code set that may be used with any database, then tailor the database connector process component to specifically access NetSuite™ or SalesForce™ by adding process component parameters associated with one of these applications. If the user uses this process component in several different integration processes, the user may wish to save this process component for later use by saving it as a NetSuite™ or SalesForce™ process component. In the future, if the user wishes to use this component, the user may simply select the NetSuite™ or SalesForce™ component, rather than repeating the process of tailoring a generic database connector process component with the specific parameters defined above.

As shown in FIG. 3, such process-representing visual elements may include a start element 302, a message element 304, a first mapping element 306*a* and a second mapping element 306*b*, a first set properties element 308*a* and a second set properties element 308*b*, a first connector element 310*a* and a second connector element 310*b*, a first stop element 312*a*, a second stop element 312*b* and a third stop element 312*c*, a branch element 314, or a data process element 316. Other embodiments might include any number of other types of visual elements, including a process call element and a decision element. Connector elements 310*a* and 310*b*, and a start element 302 in an embodiment may represent a sub-process of an integration process describing the accessing and/or manipulation of data. The start element 302 in an embodiment may also operate as a connector element.

In an embodiment, a start element 302 may operate to begin a process flow, and stop elements 312*a*, 312*b*, and 312*c* may operate to end a process flow. As discussed above, each visual element may require user input in order for a particular enterprise or trading partner to use the resulting process. The start element 302 in an embodiment may further allow or require the user to provide data attributes unique to the user's specific integration process, such as, for example, the source of incoming data to be integrated. For example, the user or the data integration protection assistance system may use a connector element to define a connection (e.g., an application managing a dataset upon which action is to be taken), and the action to be taken. A user may use a connector element to further define a location of such a dataset, according to the language and storage structure understood by the application managing such a dataset. In addition, the dataset to be accessed according to such a start element 302 may be identified by a dataset field name given in a format that adheres to the code language and storage structure used by the application/location/enterprise at which such a dataset may be accessed.

A message element 304 in an embodiment may allow a user to enter text information that may be displayed during execution of the integration process, or to append text within the metadata of a dataset being integrated during execution of the integration process. In some embodiments, the message element 304 may provide information describing aspects of the modeled integration process that may assist in debugging of code instructions, or in more efficient updates to the model. A branch element 314 in an embodiment may be used to perform multiple actions on the same dataset. For example, a dataset read from a source location, pursuant to code instructions associated with the start element 302 in an embodiment may be routed by the branch element 314 into three separate processes, each represented by the one of the three branches connected thereto. More specifically, the dataset read at start element 302 may undergo a data process pursuant to code instructions associated with the data process visual element 316, undergo a first remapping in association with mapping element 306*a*, and writing of the remapped and processed dataset to a first destination location pursuant to code instructions associated with the connector 310*a* within the process flow of the top branch.

Mapping elements 306*a* and 306*b*, or TransformMap elements in an embodiment may associate a first dataset field name for a dataset field value being retrieved from a first application or source with a second dataset field name under which that dataset field value will be stored at a second application or destination. A user may also provide an operation name that describes the purpose for changing the dataset field names of the dataset field value in such a way. Because a single integration process may transmit dataset field values between or among several sources and destinations, a process flow may include several of these mapping elements 306*a* and 306*b*, sometimes placed in series with one another. This may result in a single dataset field value receiving several different dataset field names as it moves from various sources to various destinations throughout the integration process.

The middle branch may reset metadata properties of the dataset as stored at the source location according to code instructions associated with the set properties visual element 308*a*, and the lower branch may perform a second remapping of the dataset associated with the mapping element 306*b*, and alter the metadata properties of this secondarily remapped dataset prior to deliver to a second destination location according to code instructions associated with the set properties visual element 308*b*. Each branch of a process flow model may terminate with a stop element, by convention in an embodiment. Thus, stop visual element 312*a* may end the process of the top branch, stop visual element 312*b* may end the process of the middle branch, and stop visual element 312*c* may end the process of the lower branch.

The code sets associated with the visual elements 302, 304, 306*a*, 306*b*, 308*a*, 308*b*, 310*a*, 310*b*, 312*a*, 312*c*, 312*c*, 314, and 316, including those associated with the connection location and action to be taken within a connector element may be written in any programming code language so long as they are consistent with one another. Thus, the process-representing elements in an embodiment may be programming language-agnostic. Using such process-representing elements in an embodiment, a user may model an end-to-end integration process between multiple applications that each use different naming conventions and storage structures for storage of dataset field values.

Figure 4:
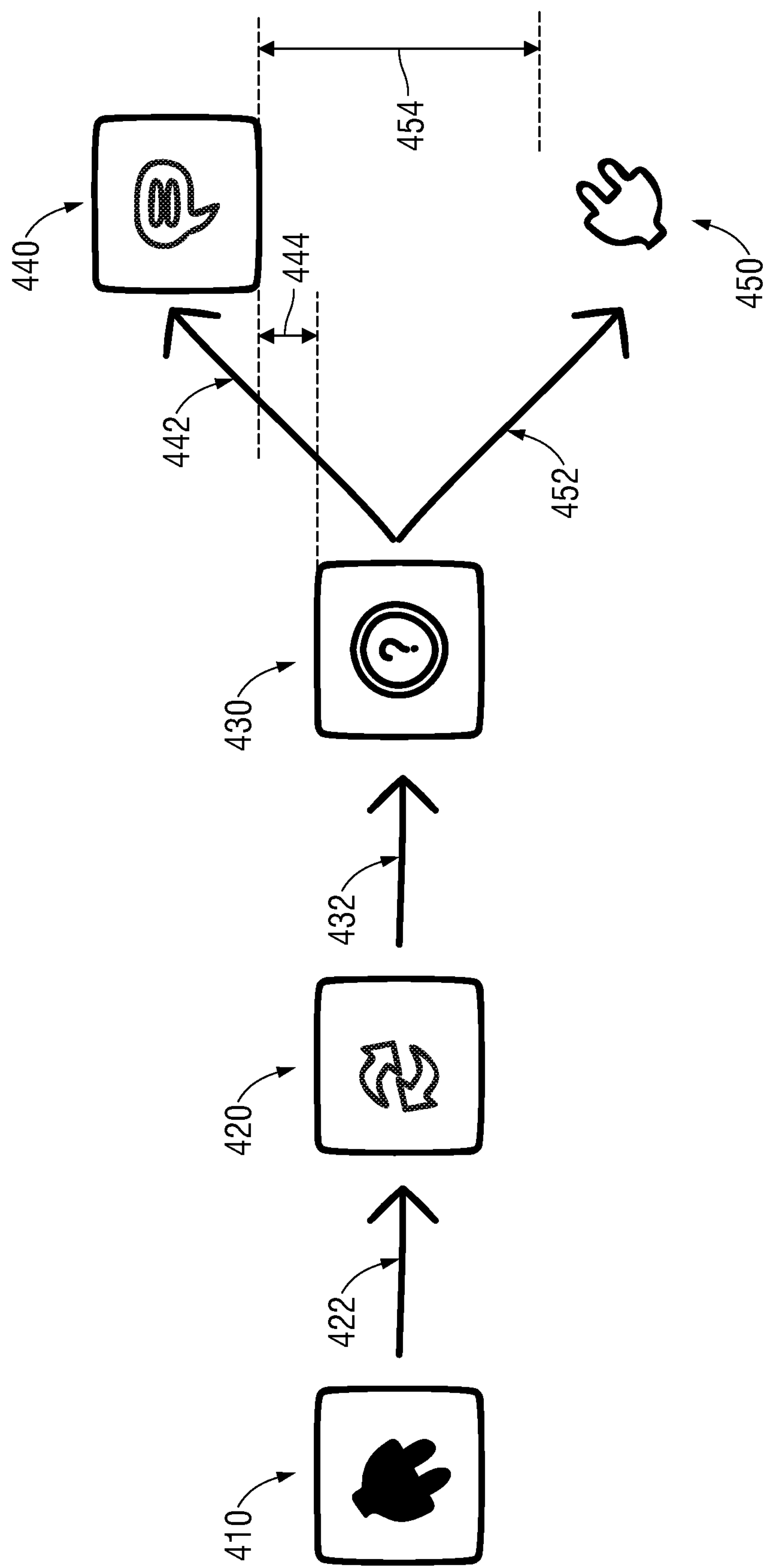
FIG. 4 is a graphical representation of a hand-drawn user illustration of an integration process flow according to an embodiment of the present disclosure.

FIG. 4 is a graphical representation of a captured image of a hand-drawn user illustration of an integration process flow according to an embodiment of the present disclosure. As described herein, integration processes in the current era of teleconferencing and videoconferencing may result from collaboration between multiple entities or individuals that may be located in the same place or geographically distant from one another. Often, the processes discussed or resulting from such collaboration begin as hand drawn illustrations (e.g., on a dry erase board, smart board, paper, or even cocktail napkin), or computer assisted sketches (e.g., created with a stylus and computer sketching application). In some cases, the images may capture user-placement of physical objects in a specific pattern, where each of the physical objects represents a step in an integration process. For example, users may arrange blocks or magnets into a process flow, where each block or magnet has an illustration of a process step (e.g., connector element, mapping element, branch element) printed or etched onto it. FIG. 4 depicts a captured image of such a hand-drawn, or user-created illustration 400. References to hand-drawn or manually-formed illustrations made herein are contemplated to include each of these types of illustrations, and user-created process flows implementing physical objects (e.g., blocks or magnets), as well as any other illustration created without the use of the graphical visual user interface described herein with respect to FIG. 3.

The integration process flow captured in the hand-drawn or manually-formed illustration 400 in an embodiment may include a plurality of illustrated process steps. For example, the illustrated process steps shown in FIG. 4 include a first connector process step illustration 410, connected via arrow 422 to mapping process step illustration 420, which is connected via arrow 432 to decision process step illustration 430. The decision process step illustration 430 may then be connected to two separate process step illustrations. For example, the decision process step illustration 430 may be connected to message process step illustration 440 via arrow 442, and connected to second connector process step illustration 450 via arrow 452. Each of the first connector process step illustration 410, the mapping process step illustration 420, and the decision process step illustration 430 in an embodiment may be situated in roughly a horizontal line with respect to one another. This alignment may reflect the intended flow of the illustrated integration process in an embodiment. For example, it may be conventional to begin a process flow with the left-most process step illustration (e.g., first connector process step illustration 410), and direct the flow in a continuous direction toward the right. Thus, it may be inferred that the first connector process step illustration 410 begins the process flow, which then continues to the process step illustration located nearest to the right side of the first connector process step illustration 410. In this case, it may be inferred that the process flow is intended to move from the first connector process step illustration 410 to the mapping process step illustration 420 because they are separated by a short horizontal distance 422, and the mapping process step illustration 420 is located directly to the right of the first connector process step illustration 410.

The decision process step illustration 430 in an embodiment may operate to perform one of two sequences of actions on a dataset as it moves through the integration process, based on whether the dataset meets preset conditions, with each sequence being represented by one of the two directions in which datasets may be routed through the decision process step illustration 430. For example, if a given dataset successfully meets the preset conditions associated with the decision process step illustration 430 (e.g., the condition is "TRUE"), then the integration process flow may be routed toward the message process step illustration 440, and a message may be generated or displayed for the user. As another example, if the given dataset does not meet the preset condition (e.g., the condition is "FALSE"), then the integration process flow may be routed toward the second connector process step illustration 450.

As can be seen in FIG. 4, the first connector processor step illustration 410 and second connector process step illustration 450 may represent similar types of process of steps (e.g., forming a connection between two data repositories for an exchange of datasets). However, because the first and second process step illustrations 410 and 450 may be hand-drawn or otherwise user-illustrated, they may not match visually. For example, the user may have drawn the first connector process step illustration 410 as a plug having a roughly square border, with an opaque interior, pointing down and to the right. In contrast, the user may have drawn the second connector process step illustration 450 as a plug having no border, as an outline of a plug without an opaque interior, with the plug pointing up and to the right. As described in greater detail with respect to FIGS. 5A, 5B, and 7, the image analysis integration flow creation system in an embodiment may be capable of determining each of these first and second connector process step illustrations 410 and 450 correspond to the same connector visual element type available for selection within the graphical visual user interface described with reference to FIG. 3, despite the apparent visual differences between them, as depicted in FIG. 4.

It may be a convention in embodiments described herein that the process flow be routed vertically upward with respect to the decision process step illustration 430 when the condition is "TRUE" and vertically downward with respect to the decision process step illustration 430 when the condition is "FALSE." For example, as shown in FIG. 4, the message process step illustration 440 is located a vertical distance 444 above the decision process step illustration 430. Although the message process step illustration 440 is also illustrated to the right of the decision process step illustration 430, in other embodiments, the process step illustration connected to a decision process step illustration may be located directly above or directly below the decision process step illustration. As also shown in FIG. 4, each of the two sequences of actions, or single actions in this case (e.g., generate a message via message process step illustration 440 or transmit the dataset for storage at a location destination via second connector process step illustration 450) that may be performed on a dataset based on whether it meets the preset decision process step illustration condition may be represented by process step illustrations (e.g., message process step illustration 440 and second connector process step illustration 450) that are separated from one another by a vertical distance 454. Such a vertical distancing between process step illustrations may also occur when multiple sequences of actions are connected to a branch process step illustration, as discussed with reference to FIG. 3. Thus, identification of two or more process step illustrations having vertical distance, but no horizontal distance between them may indicate the use of a branch e process step illustration or decision process step illustration in an embodiment.

Figure 5A:
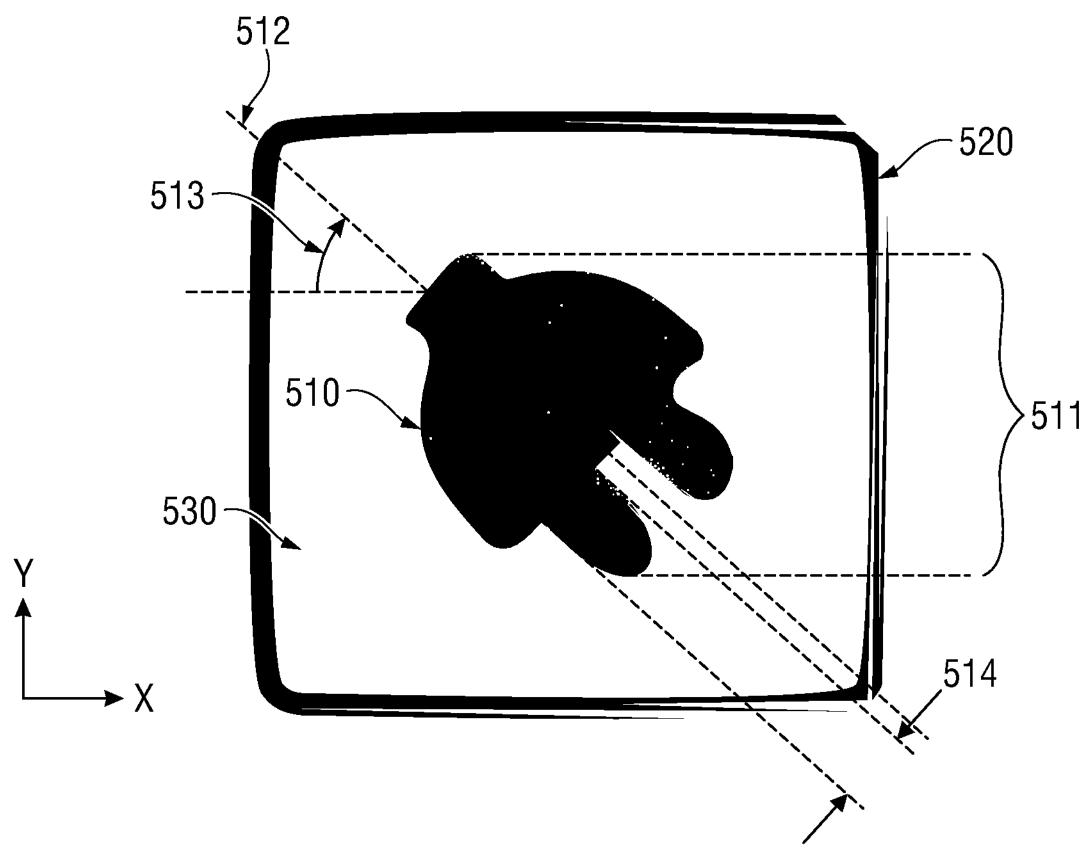
FIG. 5A is a graphical representation of a first individual process step illustration according to an embodiment of the present disclosure.

FIG. 5A is a graphical representation of a captured image of a first individual process step illustration within a hand-drawn user illustration of an integration process flow according to an embodiment of the present disclosure. As described herein, in order to create a process flow that can be used to customize code instructions for an integration process, current systems require a user to model the process flow using the graphical visual user interface, while referencing the hand-written illustrations. Embodiments described herein may automate this process, thus no longer requiring the user to duplicate the modeled process using the graphical visual user interface. This may be achieved by automatically generating the integration process flow model based on a captured image of the hand-drawn or manually-formed illustration. In embodiments described herein, a shape recognition method may identify a plurality of shapes within the captured image of the illustration, as well as several identifying parameters of each shape, such as, for example, area, perimeter, circular diameter, bounding rectangle dimensions and orientation. For example, FIG. 5A depicts an image 500 corresponding to the first connector process step illustration 410 shown in FIG. 4, above.

Each process step illustration that is identified as a shape in embodiments may correspond to a type of visual element that may be used in the graphical visual user interface to model a process flow, or may correspond to a connection between two of such visual elements (e.g., an arrow). For example, the shape recognition method may be applied in an embodiment in order to determine the process step illustration 500 as a shape that corresponds to the connector visual element (chosen from among the known and established visual elements routinely used within the graphical visual user interface).

Any shape recognition method known in the art may be used in order to identify the shapes illustrated within the hand-drawn user illustration that may correspond to visual elements within the graphical visual user interface in an embodiment. For example, a "blob detection" method that detects regions in a digital image that differ in properties, such as brightness or color, compared to surrounding regions may be used. The IJ blob feature of the ImageJ open source Java image processing program is one example of such a blob detection method. Other blob detection methods may be created based on the Laplacian of the Gaussian of an input image, the difference between Gaussians at multiple points in the input image, and the determinant of the Hessian for the input image, to name a few approaches.

As an initial step, the captured image may be converted to black and white in an embodiment. The blob detection method may then identify connected components within such a binary (black and white) image. A connected component, otherwise referred to herein as a "blob," in an embodiment may include a set of pixels that share either an edge or a corner with another pixel in the blob having the same binary status. In other words, a black pixel may be included within a blob that also includes all other black pixels that share an edge or corner. These pixels are connected horizontally, vertically, and diagonally. For example, each of the black pixels forming the interior, opaque plug shape of the illustrated connector visual element may be grouped together to form a first blob 510 in an embodiment. As another example, each of the black pixels forming the exterior surrounding border of the first connector process step illustration may be grouped together to form a second blob 520 in an embodiment. As yet another example, each of the white pixels forming the interior of the border, located between the first blob 510 and the second blob 520, may be identified as a third blob 530.

The image analysis integration process flow creation system in an embodiment may be capable of identifying a single blob or a group of blobs as one of a plurality of process step illustrations. For example, the image analysis integration process flow creation system in an embodiment may determine the first, second, and third blobs 510, 520, and 530 form a single process step illustration (e.g., corresponding to the first connector process step illustration 410). This determination may be made based on the close proximity of each of these identified blobs 510, 520, and 530 to one another, in comparison to a longer distance between the third blob 530 and other blobs identified in analysis of the captured image depicted in FIG. 4. This determination may also be made based on identification of blobs identified as having an arrow shape located on either side of the third blob 530. Identification of an arrow shape on either side of a given blob or group of blobs may indicate the given blob or group of blobs represents a single process step illustration in an embodiment because each process step illustration is conventionally connected to another process step illustration via such arrows.

Once the image analysis integration process flow creation system in an embodiment has identified one or more blobs as comprising a single process step illustration, it may be determined which type of process step (e.g., connector step, mapping step, decision step) such an illustration represents. A blob detection method used in an embodiment may be capable of determining several blob-identifying parameters for an identified blob. Such blob-identifying parameters in an embodiment may be used to determine which of the visual elements available within the graphical visual user interface corresponds to the identified blob. For example, the blob detection method in an embodiment may determine the perimeter and area enclosed by the outer contour of an object (e.g., perimeter and area). More specifically, the blob detection method in an embodiment may determine the perimeter and area enclosed by a line connecting each pixel in the outer boundary of the second blob 520 forming the boundary around the connector process step illustration of the first blob 510. The blob detection method may also identify the perimeter and area enclosed by the convex hull of the outer contour of an object (e.g., perimeter convex hull and area convex hull). A convex hull in an embodiment may comprise the smallest convex that may contain an identified blob, which may be visualized as the shape enclosed by a rubber band stretched around the edges of the blob. For example, the blob detection method in an embodiment may determine a perimeter and area for a shape surrounding the first blob 510 that may be illustrated by surrounding the first blob 510 with a rubber band.

The blob detection method in an embodiment may also determine minimum and maximum distances between two parallel tangents touching the particle outline in all directions (e.g., minimum feret diameter and maximum feret diameter). Such a "feret" diameter may be visualized as a distance between two arms of a caliper measuring the width of an irregularly shaped object. For example, the maximum distance between any two outer edges of the first blob 510 in an embodiment, visualized as being measured by a pair of calipers, may be the maximum feret diameter 511. The minimum distance between any two outer edges of the first blob 510 in an embodiment, visualized as being measured by a pair of calipers, may be the minimum feret diameter 512.

In an embodiment, the blob detection method may also determine the diameter of a maximum inscribed circle, and the orientation of the major axis with respect to the X axis of the image (e.g., orientation). For example, the major axis 513 for the first blob 510 may be oriented at an angle 514 pointing upward from the X-axis (having a positive angular value) of the captured and processed image. The blob detection method may also determine the minimum and maximum widths of a minimum bounding rectangle (smallest rectangle that may be drawn around a blob), and the aspect ratio (ratio of longest width to shortest width) of the blob. The area to the perimeter ratio of a blob may also be determined. For example, the aspect ratio for the second blob 520 may be equivalent to the determined area of a shape created by connecting each black pixel on the boundary of blob 520 divided by the determined perimeter connecting each black pixel on the outer boundary of blob 520.

The blob detection method may also be used to determine the circularity of the blob, defined as the square of the perimeter divided by the area, the elongation, defined as one minus the inverse of the aspect ratio, and the convexity, defined as the perimeter of the convex hull divided by the perimeter. In other aspects, the blob detection method in an embodiment may also be used to determine a blob's solidity, defined as the area divided by the area of the convex hull, and thinness ratio, defined as the multiplication of four, pi, and the area, divided by the square of the perimeter. Each blob's contour temperature, number of holes inside an object, and fractal box dimension determined via a box count method may also be determined in an embodiment. Each of these descriptive parameters determined via the blob detection method may serve as an input node into a neural network used to determine the type of integration process visual element illustrated by a given blob, as described in greater detail below with respect to FIG. 7.

Figure 5B:
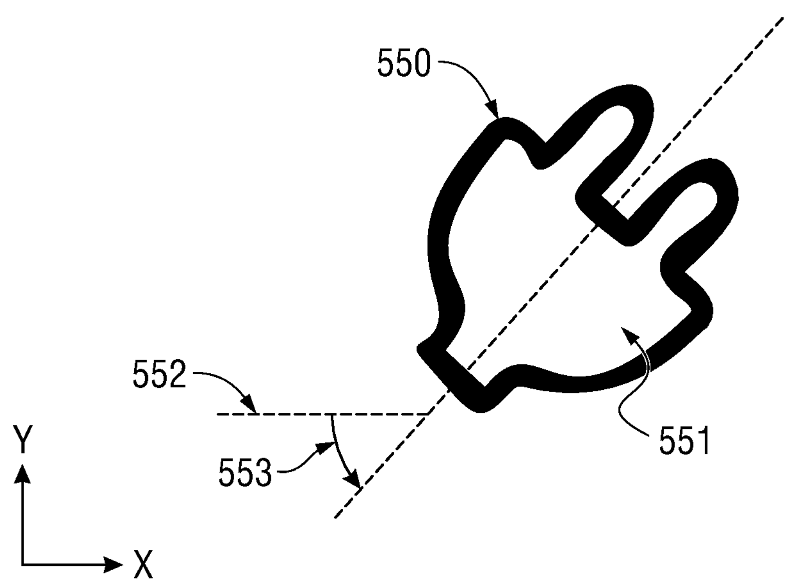
FIG. 5B is graphical representation of a second individual process step illustration according to a second embodiment of the present disclosure.

FIG. 5B is a graphical representation of a captured image of a second individual process step illustration within a hand-drawn user illustration of an integration process flow according to an embodiment of the present disclosure. As described herein, the image analysis integration flow creation system in an embodiment may be capable of determining two visually non-matching process step illustration correspond to the same connector visual element type available for selection within the graphical visual user interface, despite the apparent visual differences between them. For example, FIG. 5B may depict an image 505 corresponding to the second connector process step illustration 450 shown in FIG. 4, above, while FIG. 5A depicts an image 500 corresponding to the first connector process step illustration 410. As can be seen by comparing FIGS. 5A and 5B, although both process step illustrations 410 and 450 may be intended to illustrate the same type of process step (e.g., establishing a connection between two data storage locations for the exchange of datasets), the first and second connector process step illustrations 410 and 450 may not match visually.

For example, returning to FIG. 5B, the blob detection method may identify each of the black pixels forming the outline of a plug shape as a fourth blob 550, and each of the white pixels within this outline as a fifth blob 551. In contrast, the blob detection method may identify a group of black pixels illustrating an opaque plug shape as the first blob 510 of FIG. 5A, and a group of black pixels forming a roughly square-shaped border around the opaque plug shape as the second blob 520. Additionally, the first connector process step illustration 500 depicted in FIG. 5A may have different blob-identifying parameters than the second connector process step illustration 505 depicted in FIG. 5B. For example, the major axis 552 for the fourth blob 550 may be oriented at an angle 553, pointing downward from the X-axis (having a negative angular value) of the captured and processed image. In contrast, the major axis 513 for the first blob 510 in FIG. 5A may be oriented at an angle 514 pointing upward from the X-axis (having a positive angular value) of the captured and processed image. In other words, the blob-identifying parameters for a first blob 510 of the first connector process step illustration shown in FIG. 5A may differ from the blob-identifying parameters for a similarly shaped fourth blob 550 of the second connector process step illustration shown in FIG. 5B, because the first connector process step illustration shown in FIG. 5A points downward and to the right, while the second connector process step illustration shown in FIG. 5B points upward and to the right. As described in greater detail with respect to FIG. 7, the image analysis integration flow creation system in an embodiment may be capable of determining two visually non-matching process step illustration correspond to the same connector visual element type available for selection within the graphical visual user interface, despite the apparent visual differences between them.

Figure 6A:
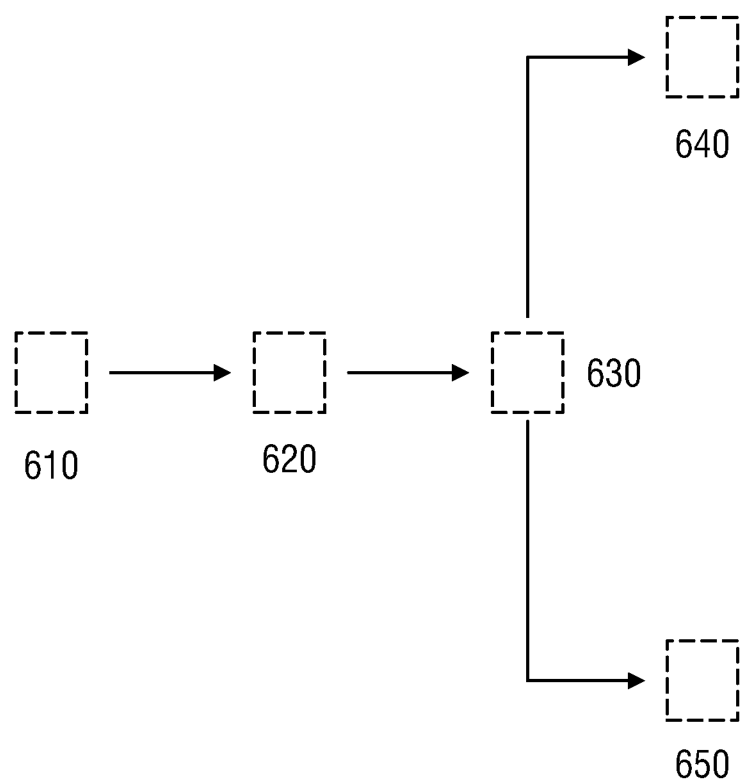
FIG. 6A is a graphical representation of a process flow plot of visual element placeholders representing process step illustrations according to an embodiment of the present disclosure.

FIG. 6A is a graphical representation of a process flow plot of a plurality of visual element placeholders representing the process step illustrations within a hand-drawn user illustration of an integration process flow, recognized using a shape recognition method according to an embodiment of the present disclosure. As described herein with reference to FIG. 5A, the image analysis integration process flow creation system in an embodiment may be capable of identifying a single blob or a group of blobs as representing a single process step illustration. In some such embodiments, the image analysis integration process flow creation system may also be capable of identifying arrow shaped blobs located between such single process step illustrations. In an embodiment, once the image analysis integration flow creation system has identified a plurality of process step illustrations in such a way, the system may plot an estimated flow or connectivity between several identified process step illustrations. Such a process flow plot may indicate placement of several visual elements, without determining the type of each of these visual elements. The process flow plot may operate to identify flow between visual elements, but may be generated prior to the image analysis integration process flow creation system determining the type of each visual element. Thus, the process flow plot may not indicate the type of each visual element included in the process flow. For example, the process flow plot may plot a connection between two visual elements, but may not specify whether these visual elements represent a connector visual element, mapping visual element, decision visual element, etc. As a consequence, the process flow plot provides visual element placeholders where specific types of visual elements may be inserted upon later identification of the type of visual element each process step illustration represents.

Once a blob or group of blobs has been identified as a process step illustration in an embodiment, the image analysis integration flow creation system may analyze the placement of each process step illustration with respect to one another to estimate the direction of the flow process and the connectivity between potential integration process flow visual elements within the image (e.g., as represented by a plurality of separately identified process step illustrations). For example, each of the process step illustrations 410, 420, 430, 440, and 450 illustrated in FIG. 4, as depicted in the captured image 400, may be associated with separately identified blobs (or groups of blobs). As described with reference to FIG. 4, orientation of each of the first connector process step illustration 410, the mapping process step illustration 420, and the decision process step illustration 430 in an embodiment in roughly a horizontal line with respect to one another may reflect the intended flow of the illustrated integration process as beginning with the left-most process step illustration (e.g., first connector process step illustration 410), and moving in a continuous direction toward the right, to connect the first connector process step illustration 410 to the mapping process step illustration 420, and the mapping process step illustration 420 to the decision process step illustration 430. Further, identification of two or more process step illustrations having vertical distance, but no horizontal distance between them (e.g., process step illustrations 440 and 450) may indicate the use of a branch process step illustration or decision process step illustration in an embodiment.

Returning to FIG. 6A, image analysis integration flow creation system may analyze the placement of each of these identified process step illustrations with respect to one another in such a way to determine a first visual element 610, a second visual element 620, and a third visual element 630 should be situated in a roughly horizontal line with respect to one another, indicating that the process flow begins with the first visual element 610, and connects the first visual element 610 to the second visual element 620, which is then connected to the third visual element 630. In some embodiments, the image analysis integration flow creation system may identify connecting arrows illustrated within the captured image as one or more blobs as well. In such an embodiment, the arrows between the first, second, and third visual elements 610, 620, and 630, respectively, may also be oriented in roughly a horizontal line with respect to these visual elements 610, 620, and 630. Thus, identification of such arrows as blobs may increase the likelihood that the process flow begins with the left-most visual element 610 and proceeds along the roughly identified axis shared by each of these identified visual elements.

The image analysis integration flow creation system in an embodiment may further determine visual elements 640 and 650 should be separated by a vertical distance, indicating the use of a branch visual element or decision visual element at 630. In such an embodiment, the image analysis integration flow creation system may infer each of the visual elements 640 and 650 are connected to the visual element 630. In an embodiment in which the image analysis integration flow creation system has identified an arrow within the captured image as a separate blob or blobs, the orientation of such an elongated blob having a central axis at an angle to the roughly horizontal axis shared by visual elements 610, 620, and 630 may reinforce this assumption. The image analysis integration flow creation system may then generate a process flow plot that represents the connectivity of each of the visual element placeholders 610, 620, 630, 640, and 650, as depicted in FIG. 6A. A process flow plot in an embodiment may resemble the integration process flow depicted in FIG. 3, which may be viewed via the graphical visual user interface, but with placeholders for visual elements of an unknown type (e.g., connector, mapping, decision) given within the process flow, rather than identified or user-selected visual elements of a specific type. The image analysis integration flow creation system may then use a neural network to determine which type of visual element is represented by each blob within the process flow plot.

Placement of each identified visual element placeholder within the flow process determined in such a way by the image analysis integration flow creation system in an embodiment may also be input into the neural network for determination of which type of integration process flow visual element each identified process step illustration (associated with one or more identified blobs) represents. For example, placement of the visual element placeholder 610 at the far-left, or traditional beginning of a process flow, may be represented within the input layer of the neural network, which may assist in determining that a start visual element should be inserted in the location of the visual element placeholder 610. As another example, connectivity of the visual element placeholder 630 to two separate visual element placeholders 640 and 650, separated from one another by a vertical distance may be represented within the input layer of the neural network, which may assist in determining either a decision or branch visual element should be inserted in the location of the visual element placeholder 630.

Figure 6B:
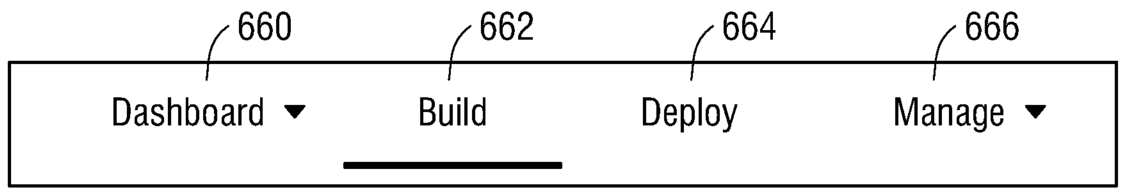
FIG. 6B is a graphical diagram illustrating a flow diagram displayed via a graphical user interface, illustrated within a hand-drawn user illustration of an integration process according to an embodiment of the present disclosure.

FIG. 6B is a graphical diagram illustrating a flow diagram of an integration process illustrated by the process step illustrations within a hand-drawn user illustration of an integration process flow according to an embodiment of the present disclosure. As described herein, the image analysis integration flow creation system may identify a plurality of process step illustrations within a captured image of a user illustration of an integration process flow, plot an estimated flow or connectivity between several identified process step illustrations, then determine which type of integration process visual element each identified process step illustration represents.

Figure 7:
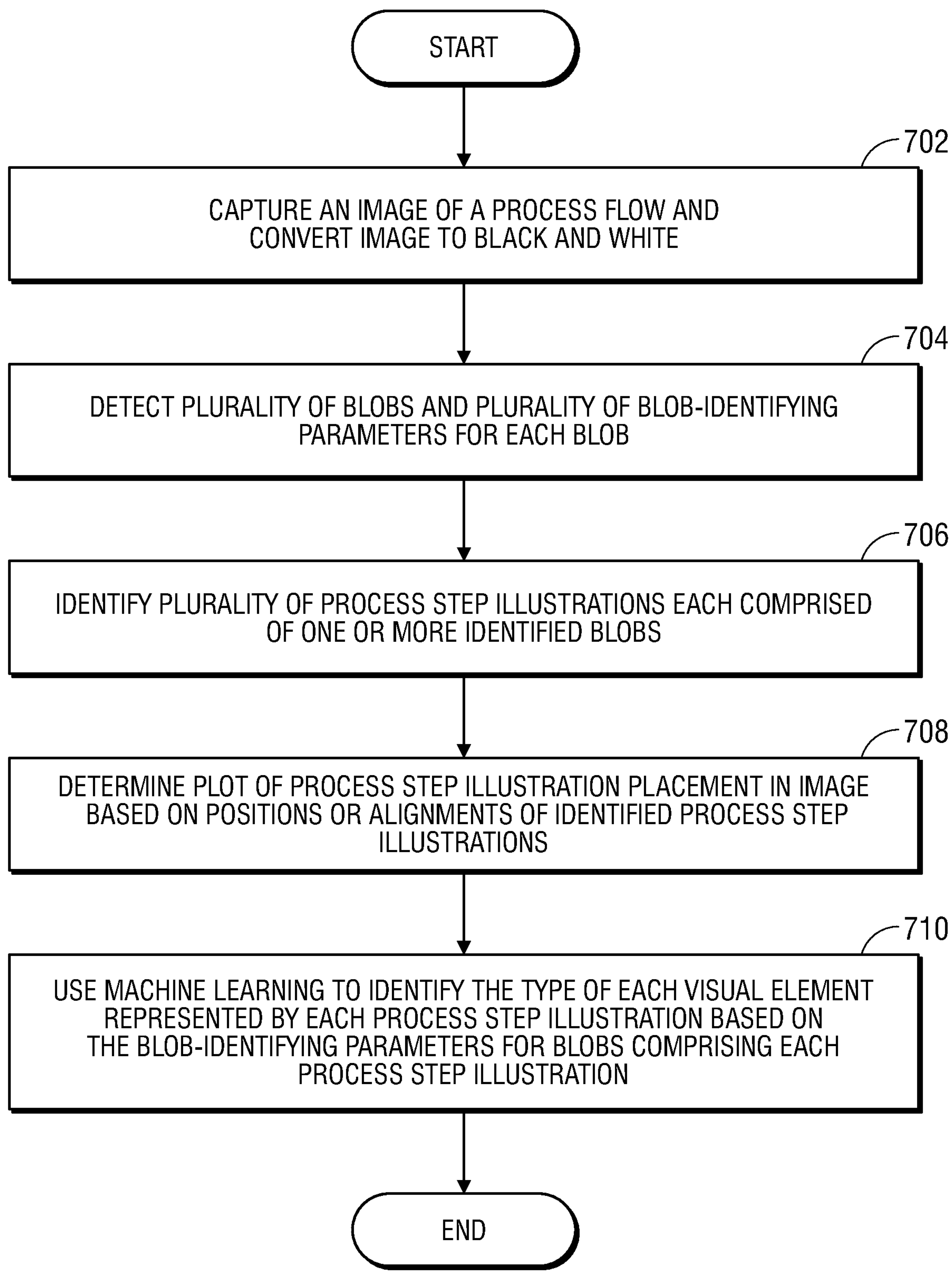
FIG. 7 is a flow diagram illustrating a method of identifying which type of visual element each process step illustration represents according to an embodiment of the present disclosure.

As described in greater detail with respect to FIG. 7, the image analysis integration flow creation system may determine the type of visual element represented by each process step illustration, based on the blob-identifying parameters associated with each process step illustration or upon placement of the placeholders associated with each process step illustration within the determined process flow plot. For example, the image analysis integration flow creation system may determine placeholder 610 in FIG. 6A is associated with the process step illustration 410 in FIG. 4, and that the process step illustration 410 represents a “connector” visual element, as described with respect to FIG. 5A. By convention, process flows in an embodiment may begin with a “start” visual element, which may function the same way as a “connector” visual element. As such, the image analysis integration flow creation system may determine the visual element associated with placeholder 610 should perform the same functions as a “connector” visual element, but because it begins the process flow, the placeholder 610 is associated with a “start” visual element 611. The image analysis integration flow creation system may then insert the start visual element 611 into placeholder 610.

As another example, the image analysis integration flow creation system may determine placeholder 620 in FIG. 6A is associated with the process step illustration 420 in FIG. 4, and that the process step illustration 420 represents a “mapping” visual element. The image analysis integration flow creation system may then insert the mapping visual element 621 into placeholder 620. As yet another example, the image analysis integration flow creation system may determine placeholder 630 in FIG. 6A is associated with the process step illustration 430 in FIG. 4, and that the process step illustration 430 represents a “decision” visual element. The image analysis integration flow creation system may then insert the decision visual element 631 into placeholder 630. By convention, decision elements in an embodiment may branch upward and downward, with a TRUE condition branching upward and a FALSE condition branching downward. As a consequence, the image analysis integration flow creation system in an embodiment may insert a TRUE label associated with the upward arrow branching outward from the decision visual element 631, and a FALSE label associated with the downward arrow branching outward from the decision visual element 631.

In still another example, the image analysis integration flow creation system may determine placeholder 640 in FIG. 6A is associated with the process step illustration 440 in FIG. 4, and that the process step illustration 440 represents a “message” visual element. The image analysis integration flow creation system may then insert the message visual element 641 into placeholder 640. In yet another example, the image analysis integration flow creation system may determine placeholder 650 in FIG. 6A is associated with the process step illustration 450 in FIG. 4, and that the process step illustration 450 represents a “connector” visual element. The image analysis integration flow creation system may then insert the connector visual element 651 into placeholder 650. By convention, process flows in an embodiment may end each branch with a “stop” visual element, even if the hand-drawn or manually-formed illustration does not include corresponding process step illustrations. Thus, the image analysis integration flow creation system may add a stop visual element 642 to the right of the message visual element 641 in order to end the process flow for the branch leading to message visual element 641, and add a stop visual element 652 to the right of the connector visual element 651 in order to end the process flow for the branch leading to the connector visual element 651.

Upon inserting the visual elements depicted by each process step illustration into the placeholders associated with each process step illustration in such a way, as well as adding start and stop visual elements, the image analysis integration flow creation system in an embodiment may display the visual elements within a process flow model within the graphical visual user interface 605. Similarly to that described above with reference to FIG. 3, the graphical visual user interface 605 may allow the user to build the process flow, deploy the integration process modeled thereby (e.g., by selecting the deploy tab 664), manage dataset field values manipulated by such an integration process (e.g., by selecting the manage tab 666), and to view high-level metrics associated with execution of such an integration process (e.g., by selecting the dashboard tab 660). The user may view or edit the process flow model generated by the image analysis integration flow creations system, based on the received digital image capturing the user-illustration of a process flow by selecting the “Build” tab 662 in a graphical user interface in an embodiment. In such a way, the image analysis integration flow creation system in an embodiment may generate an integration process flow that may be displayed via the graphical visual user interface based on analysis of a captured image of a hand-drawn or manually-formed illustration of an integration process flow.

FIG. 7 is a flow diagram illustrating a method of identifying which type of visual element a process step illustration identified within a captured image of a hand-drawn user illustration of an integration process flow represents according to an embodiment of the present disclosure. As described herein, the image analysis integration flow creation system in an embodiment may automatically generate an integration process flow model based on a captured image of a hand-drawn or manually-formed illustration. A blob detection method may identify a plurality of shapes or blobs within the captured image of the illustration, as well as several descriptive parameters. The image analysis integration flow creation system in an embodiment may then identify a plurality of process step illustrations comprised of such blobs, then create a process flow plot estimating the direction of the process flow and connectivity between each of the identified plurality of process step illustrations. A neural network may then be used to determine which visual element is represented by each identified process step illustration within the process flow plot, based on the descriptive parameters determined by the blob detection method for the blob or blobs associated with each of the plurality of process step illustrations, and based on placement of each of the process step illustrations within the process flow plot.

At block 702, the image analysis integration flow creation system in an embodiment may capture an image of a hand-drawn or manually formed user illustration of a process flow via a camera system of other image capture system. In some embodiments, the image analysis integration flow creation system may convert a received digital image of a hand-drawn user illustration of a process flow to black and white. For example, the image analysis integration flow creation system in an embodiment may receive the image depicted in FIG. 4, above. The entire received image, or portions thereof may be converted to a black and white image. For example, in an embodiment described with reference to FIGS. 5A and 5B, depicting two separate portions of the captured image, the image may be converted to black and white. Such a conversion may assist in blob detection via the blob detection method of the image analysis integration flow creation system in an embodiment. In other embodiments, different types of image recognition may be used with varying degrees of computational resources required to conduct image recognition of one or more hand-drawn or manually-formed illustration of business process steps. For example, in some embodiments, color images, grayscale images of other image types may be utilized for image recognition and generation and determination of integration business process flows via the customized data integration software application creation system of embodiments herein.

The image analysis integration flow creation system in an embodiment may detect a plurality of blobs and a plurality of blob-identifying parameters for each blob at block 704. For example, in an embodiment described with reference to FIG. 5A, the blob detection method may identify each of the black pixels or shaded pixels forming the interior plug shape of the first connector process step illustration as a first blob 510, each of the black pixels or shaded pixels forming the exterior surrounding border of the illustrated connector visual element as a second blob 520, and each of the white pixels or unshaded pixels situated between the first and second blobs 510 and 520 as a third blob 530. As another example, in an embodiment described with reference to FIG. 5B, the blob detection method may identify each of the black pixels or shaded pixels forming the outline of the plug shape of the second connector process step illustration as a fourth blob 550, and the white pixels or unshaded pixels situated inside the outline as a fifth blob 551. In other embodiments, the blob detection method may be capable of identifying arrows within the hand-drawn or manually-formed illustration as blobs. Such determinations may be made, in an embodiment, based on the fact that each set of pixels shares either an edge or a corner with another pixel in the blob having the same binary status (black or white).

As also described in an embodiment with reference to FIG. 5A, the blob detection method may determine several descriptive parameters of an identified blob (e.g., blobs 510, 520, or 530). For example, the blob detection method in an embodiment may also determine the perimeter and area, perimeter convex hull and area convex hull, minimum feret diameter and maximum feret diameter, orientation, minimum and maximum widths of a minimum bounding rectangle, ratio of longest width to shortest width, area to the perimeter ratio, circularity, convexity, solidity, contour temperature, number of holes inside an object, and fractal box dimension. Other forms of image recognition are contemplated as well to correlate hand-drawn of manually formed illustrations with recognition as business process elements for use with a customized data integration software application creation system of embodiments herein.

Returning to FIG. 7, at block 706, the image analysis integration flow creation system in an embodiment may identify a plurality of process step illustrations, each comprised of one or more identified blobs. For example, in an embodiment described with reference to FIG. 5A, the image analysis integration process flow creation system may determine the first, second, and third blobs 510, 520, and 530 form a single process step illustration (e.g., corresponding to the first connector process step illustration 410 depicted in FIG. 4). This determination may be made based on the close proximity of each of these identified blobs 510, 520, and 530 to one another, in comparison to a longer distance between the third blob 530 and other blobs identified in analysis of the captured image depicted in FIG. 4. This determination may also be made based on identification of blobs identified as having an arrow shape located on either side of the third blob 530. Identification of an arrow shape on either side of a given blob or group of blobs may indicate the given blob or group of blobs represents a single process step illustration in an embodiment because each process step illustration is conventionally connected to another process step illustration via such arrows. In such a way, the image analysis integration flow creation system in an embodiment may analyze an image to identify separate process step illustrations and associate each identified process step illustration with the identified blob or blobs comprising it. For example, the image analysis integration flow creation system in embodiments described with reference to FIG. 4 may identify separate process step illustrations 410, 420, 430, 440, and 450 and recognize each as a separate illustration. As another example, the image analysis integration flow creation system in embodiments described with reference to FIGS. 4, 5A, and 5B may associate the first, second, and third blobs 510, 520, and 530 in FIG. 5A with the first connector step illustration 410 of FIG. 4, and associate the fourth and fifth blobs 550 and 551 in FIG. 5B with the second connector step illustration 450 of FIG. 4.

At block 708, the image analysis integration flow creation system in an embodiment may generate a process flow plot, illustrating placement of the identified process step illustrations within a process flow. As described herein, once the image analysis integration flow creation system has identified a plurality of process step illustrations, the system may plot an estimated flow or connectivity between several identified process step illustrations. Such a process flow plot may indicate placement of several visual elements, prior to determination of the type of each of these visual elements the process step illustrations represent. Thus, the process flow plot may not indicate the type of each visual element included in the process flow. As a consequence, the process flow plot provides visual element placeholders in the locations of identified process step illustrations, where specific types of visual elements may be inserted upon later identification of the type of visual element each process step illustration represents.

The image analysis integration flow creation system in an embodiment may determine placement of each visual element placeholder within the process flow plot based on analysis of placement of each process step illustration in the received image. For example, as described with reference to FIG. 4, orientation of each of the first connector process step illustration 410, the mapping process step illustration 420, and the decision process step illustration 430 in an embodiment in roughly a horizontal line with respect to one another may reflect the intended flow of the illustrated integration process as beginning with the left-most process step illustration (e.g., first connector process step illustration 410), and moving in a continuous direction toward the right, to connect the first connector process step illustration 410 to the mapping process step illustration 420, and the mapping process step illustration 420 to the decision process step illustration 430. Further, identification of two or more process step illustration separated by a vertical distance, but having no horizontal distance between them (e.g., process step illustrations 440 and 450) may indicate the use of a branch process step illustration or decision process step illustration in an embodiment.

In an embodiment described with reference to FIG. 6A, the image analysis integration flow creation system may then generate a process flow plot connecting a plurality of visual element placeholders according to the connections inferred between the process step illustrations within the analyzed image. For example, the image analysis integration flow creation system may analyze the placement of each of the process step illustrations with respect to one another in such a way to determine a first visual element placeholder 610, a second visual element placeholder 620, and a third visual element placeholder 630 are situated in a roughly horizontal line with respect to one another, with the first visual element placeholder 610 located furthest to the left. The image analysis integration flow creation system may also determine that the process flow begins with the first visual element placeholder 610, and connects the first visual element placeholder 610 to the second visual element placeholder 620, which is then connected to the third visual element placeholder 630. The image analysis integration flow creation system may also infer each of the visual element placeholders 640 and 650 are connected to the visual element placeholder 630, because the process step illustrations corresponding to visual element placeholders 640 and 650 (e.g., 440 and 450 in FIG. 4) are separated by a vertical distance, but share a roughly vertical axis. In an embodiment in which the image analysis integration flow creation system has also identified a blob matching the description of an arrow, the image analysis integration flow creation system may insert an arrow at the location of that blob with respect to the other blobs. The image analysis integration flow creation system may then generate a process flow plot that represents the connectivity of each of the visual element placeholders 610, 620, 630, 640, and 650, as depicted in FIG. 6A.

The image analysis integration flow creation system may then use a neural network to determine the type of visual element is represented by each process step illustration at block 710. For example, the image analysis integration flow creation system in an embodiment may model the relationships between the blob-identifying parameters determined for a given blob, and the type of visual element represented by the given blob, using a layered neural network topology. In some embodiments, the neural network may also model a relationship between the position or orientation of the visual element placeholder associated with the process step illustration comprised by the given blob, with respect to other visual element placeholders, within the process flow plot. Such a neural network of the image analysis integration flow creation system in an embodiment may include a plurality of layers, where each layer includes a plurality of nodes representing metric values or states for each of the blob-identifying parameters determined via the blob-detection method, and position or orientation of the visual element placeholder associated with that blob within the integration process flow plot. An input layer to the neural network, for example, may include a known, recorded set of values for each of these blob-identifying parameters (e.g., perimeter, area, circularity, elongation, aspect ratio, etc), and a binary state (yes or no) depicting whether the visual element placeholder associated with the blob is located within the horizontal primary axis of the plot, or is located just to the left of, or within a line of blobs separated vertically rather than horizontally. An output layer to the neural network may include a projected best-fit determination of an integration process flow visual element type (e.g., one of the types of visual elements from which a user may choose when building a process flow using the graphical visual user interface shown in FIG. 3) based on the known, recorded set of values in the input layer. In other embodiments, such a determination may be made using machine learning, or any artificial intelligence methodologies now known or later developed.

The image analysis integration flow creation system in an embodiment may attempt to determine the degree to which each of these blob-identifying parameters and flow plot positional states can accurately differentiate between visual element types by assigning preliminary weight matrices to each of the nodes in a given layer, where each assigned weight value in the matrix describes a correlation between at least one of these blob-identifying parameters, or flow plot positional states, and each available visual element type. The neural network of the image analysis integration flow creation system may be modeled using any number of layers, and the nodes in each additional layer may be determined based on the value of the nodes in the previous layer and the weight matrices describing correlations between each of the blob-identifying parameters, flow plot positional states, and each available visual element type. In other words, each new layer in the neural network may include a plurality of nodes representing a best guess of the ability of a blob-identifying parameter or a flow plot positional state to accurately determine the type of visual element the blob represents or illustrates. A greater number of layers within the neural network topology may decrease the likelihood of divergence (yielding unusable results), but may increase processing time. The neural network of the image analysis integration flow creation system may then produce an output layer including an identification of the type of visual element the process step illustration comprised by the blob described by the blob-identifying parameters and having the flow plot positional state illustrates. For example, the output layer in an embodiment may include a node for each available type of visual element, with each node having a value of either zero (indicating the neural network estimates the process step illustration the blob comprises does not illustrate that visual element type), or a one (indicating the neural network estimates the process step illustration the blob comprises illustrates that visual element type). The process of generating an output layer, based on a known set of input layer values may be described herein as forward propagation. An initial forward propagation in an embodiment may project an estimated visual element type.

The image analysis integration flow creation system may employ several rounds of forward propagation and backward propagation to "train" a neural network in an embodiment. For example, during such a training process, an initial forward propagation may be performed on a blob comprising a process step illustration representing a preset and known visual element (e.g., a connector element). An initial forward propagation in such an embodiment may yield an estimation that the blob illustrates a mapping element, rather than a connector element. In the next step of such a training session, the image analysis integration flow creation system may compare the estimated visual element type (e.g., mapping element) with the known visual element type (e.g., connector element), to determine a degree of error (e.g., because the first forward propagation identified a connector element as a mapping element) in the output layer of the initial forward propagation. The image analysis integration flow creation system may then use these known error margins to adjust the weight matrices associated with each layer of the modeled neural network. For example, the image analysis integration flow creation system may perform a back-propagation method to adjust each of the weight matrices in order to more accurately reflect the correlations between each of these blob-identifying parameters, flow plot positional states, and visual element types.

The image analysis integration flow creation system in an embodiment may perform this forward propagation and backward propagation, using different input node values repeatedly, to finely tune the weight matrices. For example, each time the image analysis integration flow creation system performs a neural network analysis on an identified blob to determine the type of visual element the process step illustration comprised by the blob represents, the image analysis integration flow creation system may forward propagate the blob-identifying parameters, flow plot positional states, and visual element types through the neural network. This may occur for each identified blob within a given image, and for each image captured and transmitted to the image analysis integration flow creation system from a plurality of users. In other words, the image analysis integration flow creation system may perform such a learning method, and increase the accuracy of its determinations, based on forward and backward propagations performed on crowd-sourced information from a plurality of the service provider's customers. In such a way, the image analysis integration flow creation system in an embodiment may adaptively learn how changes in these descriptive parameters and flow plot positional states for a given blob may affect the accuracy of an estimated determination of the visual element type the process step illustration comprising the blob illustrates.

Figure 8:
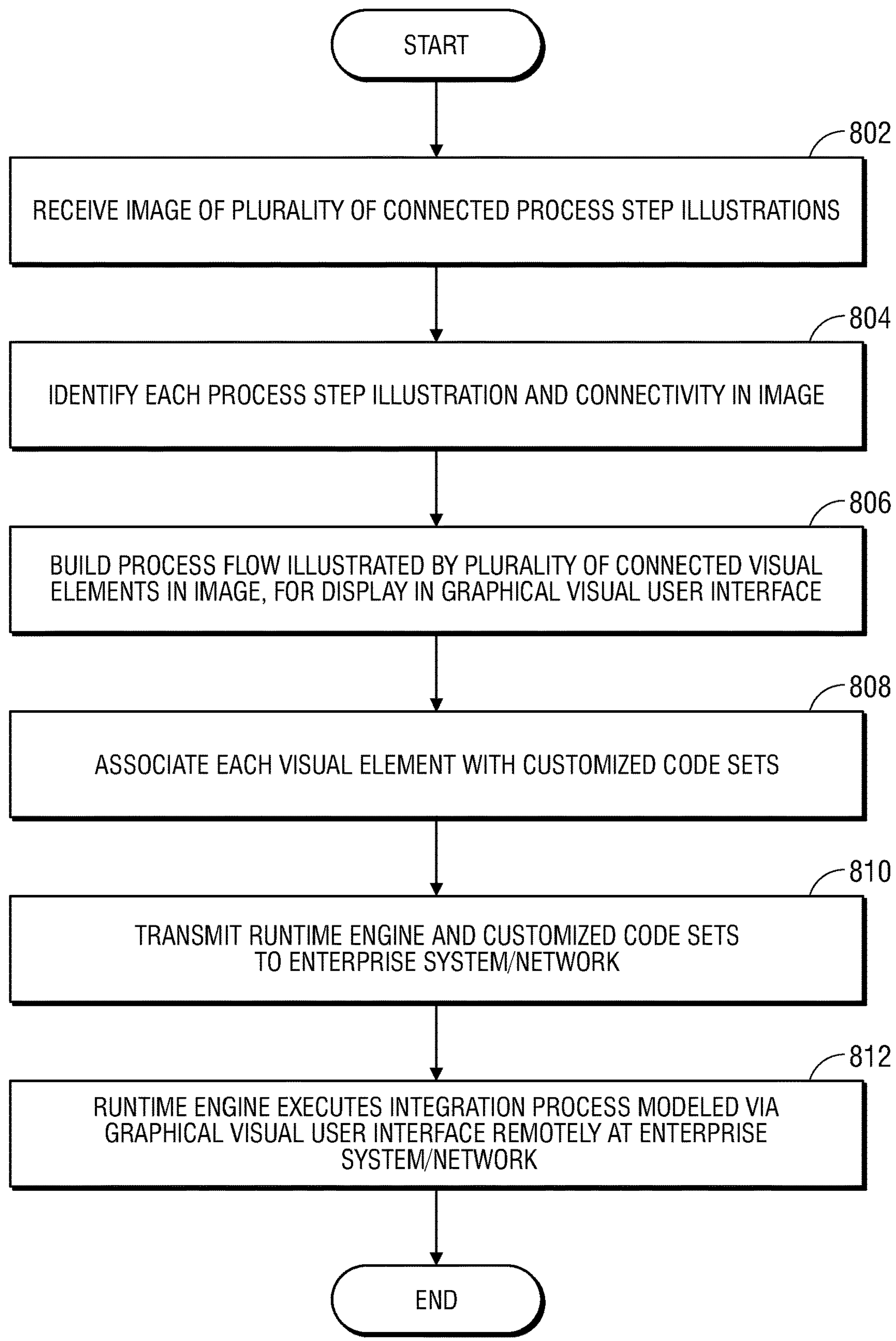
FIG. 8 is a flow diagram illustrating a method of generating code instructions for a hand-drawn integration process according to an embodiment of the present disclosure.

FIG. 8 is a flow diagram illustrating a method of automatically generating customized code instructions for an integration process modeled based on a captured image of a hand-drawn user illustration according to an embodiment of the present disclosure. As described herein, a visual model of the process flow may be generated by automatically connecting each identified type of visual element according to the determined plot position for its associated shape. In such a way, embodiments of the present disclosure may automate generation of an integration process flow model, viewable via the graphical visual user interface, based on a captured image of a hand-drawn or manually-formed illustration of the intended process flow. Once the process flow indicating what a user wishes to achieve has been automatically modeled based on the captured image of an illustration in embodiments herein, the code instructions capable of achieving such a task may be generated and transmitted to an enterprise customer for remote execution.

At block 802, the image analysis integration flow creation system in an embodiment may receive a captured image of a plurality of connected process step illustrations. As described herein, integration processes in the current era of teleconferencing and videoconferencing may result from collaboration between multiple entities or individuals that may be located in the same place or geographically distant from one another. Often, the processes discussed or resulting from such collaboration begin as hand drawn illustrations (e.g., on a dry erase board, smart board, paper, or even cocktail napkin), or computer assisted sketches (e.g., created with a stylus and computer sketching application). In other embodiments, images formed on pre-fabricated placards, plates, or cards, such as etched or printed on plates or cards may be placed in various series and forms to manually form a process flow for use with customized data integration software application creation system of embodiments herein. For example, plates may be etched or colored to correspond with process elements and may have magnetic or other adhesive backing for arrangement on a board in some example embodiments. The image received at block 802 may capture such a hand-drawn or manually-formed illustration, or computer-assisted sketch (e.g., sketch generated using an application other than the graphical visual user interface described above with respect to FIG. 3). For example, in an embodiment described with reference to FIG. 4, the image analysis integration flow creation system may receive the captured image 400 that includes a hand-drawn or manually-formed illustration connecting process step illustrations 410, 420, 430, 440, and 450.

Figure 6B:
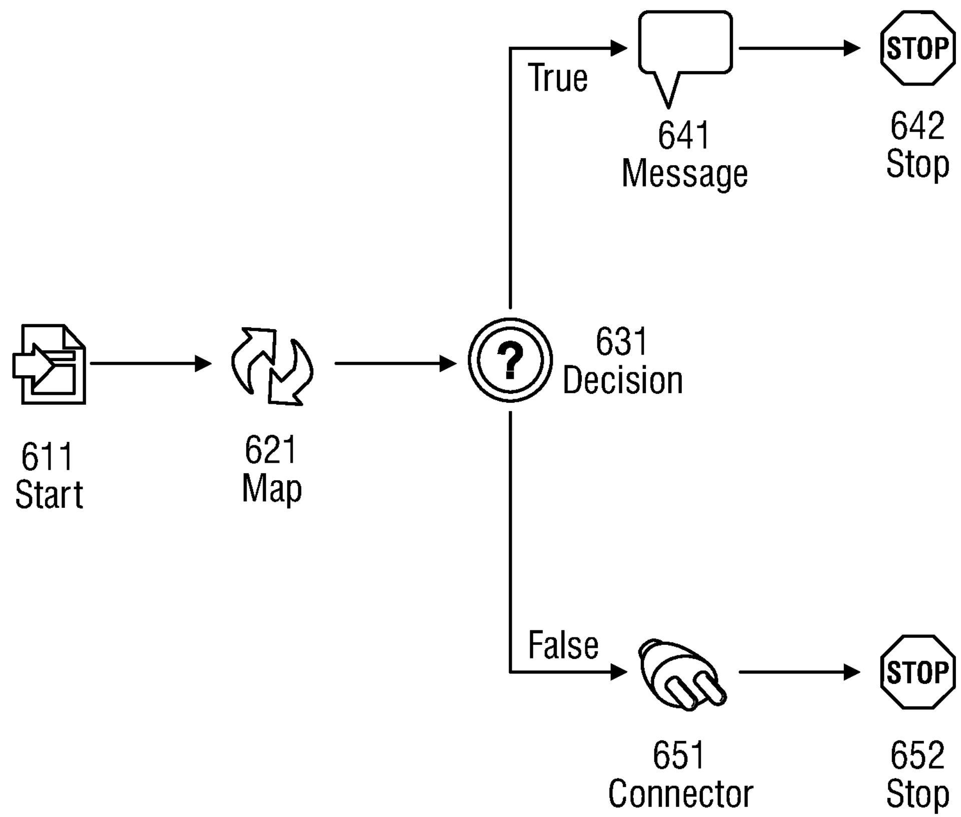

The image analysis integration flow creation system may identify the connectivity and type of visual element within the captured image at block 804 in an embodiment. As described herein, the process flow plot may connect a plurality of visual element placeholders, where specific types of visual elements may later be inserted, upon identification of the specific type of visual element each process step illustration represents. As described in greater detail with reference to FIGS. 6 and 7, the image analysis integration flow creation system in an embodiment may identify the type of visual element represented by each process step illustration, and plot the position of each process step illustration within the process flow plot. For example, in an embodiment described with reference to FIG. 4, the neural network of the image analysis integration flow creation system may determine the process step illustration 410 represents a connector visual element. As another example, in an embodiment described with reference to FIG. 6A, the image analysis integration flow creation system may generate a process flow plot that includes a visual element placeholder 610, having the same position in the process flow plot that the process step illustration 410 has within the captured image. The image analysis integration flow creation system in such an embodiment may associate the visual element placeholder 610, illustrated in FIG. 6A, with the process step illustration 410, depicted in FIG. 4.

At block 806, the image analysis integration flow creation system in an embodiment may build an integration process flow model illustrated by the plurality of identified process step illustrations within the captured image, for display in a graphical visual user interface. The image analysis integration flow creation system in an embodiment may do so by inserting the type of visual element determined by the neural network to be represented by a given process step illustration into the position of the visual element placeholder associated with the given process step illustration in the process flow plot. For example, upon the neural network determining the process step illustration 410 represents a connector visual element, the image analysis integration flow creation system in an embodiment may insert a connector visual element icon into the visual element placeholder 610 within the process flow plot. The image analysis integration flow creation system in such an embodiment may perform this process with respect to each process step illustration and its corresponding visual element placeholder, until an integration process flow model like that described with reference to FIG. 3 above has been generated. Such an integration process flow model in an embodiment may then be viewed by the user via the graphical visual user interface. In such a way, the image analysis integration flow creation system in an embodiment may generate an integration process flow that may be displayed via the graphical visual user interface based on analysis of a captured image of a hand-drawn or manually-formed illustration of an integration process flow.

The integration application management system in an embodiment may identify stored code instructions associated with each visual element given in the automatically generated integration process flow model displayed based on the captured image of the hand-drawn or manually-formed illustration at block 808. For example, in an embodiment described with reference to FIG. 2, the service provider system/server 230 in an embodiment may host the integration process-modeling user interface allowing the user to model an integration process including one or more subprocesses for data integration through a business process data exchange between an enterprise system/network 210 and outside entities or between multiple applications operating at the business process system 214. Such an integration process in an embodiment may be illustrated by the process flow built and displayed by the image analysis integration flow creation system, based on the captured image of a hand-drawn or manually-formed illustration of such a process flow. The visual elements, and the ways in which they are connected within the process flow in an embodiment may model the ways in which the user wishes data to be accessed, moved, and/or manipulated during the one or more business process data exchanges, or executions of the API. The recognized visual process elements and flow may be viewed an edited in a graphical user interface of a customized data integration software application creation system of embodiments herein for further refinement or for approval for generation of one or more runtime engines for execution of a business integration process. Each connector element the image analysis integration flow creation system adds to the integration process flow diagram in an embodiment may be associated with a pre-defined subset of code instructions stored at the service provider systems/server 230 in an embodiment.

At block 810, the integration application management system in an embodiment may transmit a runtime engine and the customized code sets associated with each identified visual element to the enterprise system/network for remote execution. For example, in an embodiment described with reference to FIG. 2, the service provider system/server 230 may generate a run-time engine capable of executing the pre-defined subsets of code instructions represented by the visual elements indicated by the image analysis integration flow creation system. The runtime engine in an embodiment may execute the customized code instructions associated with the visual elements indicated by the image analysis integration flow creation system remotely from the service provider at block 812. The runtime engine may execute the subsets of code instructions in the order defined by the modeled flow of the visual elements given in the integration process flow diagram generated by the image analysis integration flow creation system at the user's enterprise system/network 214. In such a way, an integration process may be executed, based on a user's hand-drawn or manually-formed illustration of such a process, without the user having to access, read, or write the code instructions of such an integration process.

The blocks of the flow diagrams 7-8 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the methods above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an image analysis integration flow creation system comprising:

a network interface device receiving a captured image of an illustrated integration process flow chart connecting a plurality of process step illustrations to one another in a user-specified pattern;

a processor determining a process flow plot connecting each of an identified plurality of visual element placeholders, each corresponding to one of the plurality of process step illustrations, according to the user-specified pattern;

the processor analyzing the captured image to identify, for each of the plurality of process step illustrations, an image shape within the process step illustration, and a plurality of image shape-identifying parameters for the image shape and applying a neural network to determine a type of integration process visual element represented by the process step illustration, based on the plurality of image shape-identifying parameters; and the processor generating an integration process flow model displayed in a graphical user interface (GUI) by inserting, for each of the plurality of process step illustrations, the type of integration process visual element represented by the process step illustration into the visual element placeholder of the process flow plot corresponding to the process step illustration.

2. The information handling system of claim 1 further comprising:

the neural network determining the type of integration process visual element illustrated by each of the plurality of process step illustrations, based on a position of each of the visual element placeholders associated with each of the plurality of process step illustrations within the process flow plot.

3. The information handling system of claim 1 further comprising:

the neural network determining the type of integration process visual element illustrated by each of the plurality of process step illustrations, based on a determined likelihood that a value of one of the plurality of image-shape identifying parameters differentiates one of the plurality of process step illustrations from a remainder of the plurality of process step illustrations.

4. The information handling system of claim 3, wherein the likelihood that the value of one of the plurality of image shape-identifying parameters differentiates one of the plurality of process step illustrations from the remainder of the plurality of process step illustrations is determined based on crowd-sourced image shape-identifying parameter values.

5. The information handling system of claim 1, wherein the illustrated integration process flow chart is at least partially a hand-drawn or manually-formed illustration.

6. The information handling system of claim 1, wherein the illustrated integration process flow chart is a computer-assisted sketch drawn by a user.

7. The information handling system of claim 1 further comprising:

the processor associating each integration process visual element displayed within the integration process flow model with one of a plurality of custom connector code sets and generating a runtime engine; and the network interface device transmitting the plurality of custom connector code sets and runtime engine to an enterprise system for remote execution.

8. A method of image analysis integration flow creation comprising:

receiving, via a network interface device, a captured image of an illustrated integration process flow chart connecting a plurality of process step illustrations to one another in a user-specified pattern;

determining, via a processor, a process flow plot connecting each of an identified plurality of visual element placeholders, each corresponding to one of the plurality of process step illustrations, according to the user-specified pattern;

analyzing, via the processor, the captured image to identify, for each of the plurality of process step illustrations, an image shape within the process step illustration, and a plurality of image shape-identifying parameters for the image shape and applying a neural network to determine a type of integration process visual element represented by the process step illustration, based on the plurality of image shape-identifying parameters;

generating an integration process flow model displayed in a graphical user interface (GUI) GUI by inserting, via a processor, for each of the plurality of process step illustrations, the type of integration process visual element represented by the process step illustration into the visual element placeholder of the process flow plot corresponding to the process step illustration.

9. The method of claim 8 further comprising:

determining, via the neural network, the type of integration process visual element illustrated by each of the plurality of process step illustrations, based on a position of each of the visual element placeholders associated with each of the plurality of process step illustrations within the process flow plot.

10. The method of claim 8 further comprising:

determining, via the neural network, the type of integration process visual element illustrated by each of the plurality of process step illustrations, based on a determined likelihood that a value of one of the plurality of image-shape identifying parameters differentiates one of the plurality of process step illustrations from a remainder of the plurality of process step illustrations.

11. The method of claim 10, wherein the likelihood that the value of one of the plurality of image shape-identifying parameters differentiates one of the plurality of process step illustrations from the remainder of the plurality of process step illustrations is determined based on crowd-sourced image shape-identifying parameter values.

12. The method of claim 8, wherein the illustrated integration process flow chart is at least partially a hand-drawn or manually-formed illustration.

13. The method of claim 8, wherein the illustrated integration process flow chart is a computer-assisted sketch drawn by a user.

14. The method of claim 8 further comprising:

associating, via the processor, each integration process visual element displayed within the integration process flow model with one of a plurality of custom connector code sets and generating a runtime engine; and transmitting, via the network interface device, the plurality of custom connector code sets and runtime engine to an enterprise system for remote execution.

15. An information handling system operating an image analysis integration flow creation system comprising:

a network interface device receiving a captured image of an illustrated integration process flow chart connecting a plurality of process step illustrations to one another in a user-specified pattern;

a processor determining a process flow plot connecting each of an identified plurality of visual element placeholders, each corresponding to one of the plurality of process step illustrations, according to the user-specified pattern;

the processor analyzing the captured image to identify, for each of the plurality of process step illustrations, an image shape within the process step illustration, and a plurality of image shape-identifying parameters for the image shape and applying a neural network to determine a type of integration process visual element represented by the process step illustration, based on the plurality of image shape-identifying parameters;

the processor generating an integration process flow model displayed in a graphical user interface (GUI) GUI by inserting, for each of the plurality of process step illustrations, the type of integration process visual element represented by the process step illustration into the visual element placeholder of the process flow plot corresponding to the process step illustration;

the processor associating each integration process visual element displayed within the integration process flow model with one of a plurality of custom connector code sets and generating a runtime engine; and the network interface device transmitting the plurality of custom connector code sets and runtime engine to an enterprise system for remote execution.

16. The information handling system of claim 15 further comprising:

the neural network determining the type of integration process visual element illustrated by each of the plurality of process step illustrations, based on a position of each of the visual element placeholders associated with each of the plurality of process step illustrations within the process flow plot.

17. The information handling system of claim 15 further comprising:

the neural network determining the type of integration process visual element illustrated by each of the plurality of process step illustrations, based on a determined likelihood that a value of one of the plurality of image-shape identifying parameters differentiates one of the plurality of process step illustrations from a remainder of the plurality of process step illustrations.

18. The information handling system of claim 17, wherein the likelihood that the value of one of the plurality of image shape-identifying parameters differentiates one of the plurality of process step illustrations from the remainder of the plurality of process step illustrations is determined based on crowd-sourced image shape-identifying parameter values.

19. The information handling system of claim 15, wherein the illustrated integration process flow chart is at least partially a hand-drawn or manually-formed illustration.

20. The information handling system of claim 15, wherein the illustrated integration process flow chart is a computer-assisted sketch drawn by a user.

* * * * *